United States Patent
Katyal et al.

(10) Patent No.: US 11,416,279 B2
(45) Date of Patent: Aug. 16, 2022

(54) DISKS IN A VIRTUALIZED COMPUTING ENVIRONMENT THAT ARE BACKED BY REMOTE STORAGE

(71) Applicant: VMware, Inc., Palo Alto, CA (US)

(72) Inventors: Puneet Birender Katyal, San Jose, CA (US); Mark Johnson, McKinleyville, CA (US)

(73) Assignee: VMWARE, INC., Palo Alto, CA (US)

( * ) Notice: Subject to any disclaimer, the term of this patent is extended or adjusted under 35 U.S.C. 154(b) by 211 days.

(21) Appl. No.: 16/934,012

(22) Filed: Jul. 21, 2020

(65) Prior Publication Data

US 2022/0027180 A1    Jan. 27, 2022

(51) Int. Cl.
*G06F 9/455* (2018.01)
*H04L 67/1097* (2022.01)
*H04L 67/568* (2022.01)

(52) U.S. Cl.
CPC ...... *G06F 9/45558* (2013.01); *H04L 67/1097* (2013.01); *H04L 67/2842* (2013.01); *G06F 2009/45583* (2013.01); *G06F 2009/45595* (2013.01)

(58) Field of Classification Search
CPC .. G06F 9/45558; H04L 67/10–67/1097; H04L 67/28–67/2842
See application file for complete search history.

(56) References Cited

U.S. PATENT DOCUMENTS

| | | | |
|---|---|---|---|
| 2007/0079060 A1* | 4/2007 | Burkey | G06F 3/0632 711/112 |
| 2010/0333116 A1* | 12/2010 | Prahlad | G06F 16/1844 713/153 |
| 2015/0324381 A1* | 11/2015 | Brand | G06F 21/6218 707/829 |
| 2016/0292193 A1* | 10/2016 | Madanapalli | H04L 67/1097 |
| 2017/0262345 A1* | 9/2017 | Wang | H04L 67/10 |
| 2018/0314542 A1* | 11/2018 | Karkun | G06F 16/137 |

OTHER PUBLICATIONS

"Virtual Disk Format 5.0," VMware, Inc., available at <URL: https://www.vmware.com/support/developer/vddk/vmdk_50_technote.pdf>, Dec. 20, 2011, 14 pages.
"NVIDIA/vdisc", available at <URL: https://github.com/NVIDIA/vdisc>, copyright 2020, 4 pages.

(Continued)

*Primary Examiner* — Clayton R Williams
(74) *Attorney, Agent, or Firm* — Su IP Consulting

(57) ABSTRACT

A hybrid cloud storage solution provides a private cloud storage system that is backed by a public cloud storage system. The private cloud storage system caches data files that are accessed from the public cloud storage system by virtual machines or containers in a virtualized computing environment. Subsequent accesses are directed towards the cached data files in the private cloud storage system, rather than being directed towards the public cloud storage system, thereby reducing costs and performance overhead associated with accessing the public cloud storage systems. The cached data files are contained in virtual machine disks (VMDKs) that are portable between virtualized computing instances that run in the virtualized computing environment.

21 Claims, 3 Drawing Sheets

(56) References Cited

OTHER PUBLICATIONS

"s3fs-fuse / s3fs-fuse", available at <URL: https://github.com/s3fs-fuse/s3fs-fuse>, copyright 2010, 6 pages.
"kahing/goofys", available at <URL: https://github.com/kahing/goofys>, copyright 2015-2019, 6 pages.
"kahing/catfs", available at <URL: https://github.com/kahing/catfs>, copyright 2017, 6 pages.
"Amazon FSx for Lustre," Amazon Web Services, Inc., available at <URL: https://aws.amazon.com/fsx/lustre/>, copyright 2020, 7 pages.
"AWS Storage Gateway," Amazon Web Services, Inc., available at <URL: https://aws.amazon.com/storagegateway/>, copyright 2020, 12 pages.
"Data Lake Storage on AWS," Amazon Web Services, Inc., available at <URL: https://aws.amazon.com/products/storage/data-lake-storage/>, copyright 2020, 18 pages.
"Disk Cache Quickstart Guide," MinIO, available at <URL: https://docs.min.io/docs/minio-disk-cache-guide.html>, 2020, 2 pages.
"achiecobbs/s3backer", available at <URL: https://github.com/archiecobbs/s3backer>, copyright 2020, 8 pages.
"Dell EMC ECS Object Storage", Dell Inc., available at <URL: https://www.delltechnologies.com/en-US/storage/ecs/index.htm#scroll=off&accordion0>, copyright 2020, 13 pages.
Kubernetes Documentation: Volumes, available at <URL: https://kubernetes.io/docs/concepts/storage/volumes/>, May 15, 2020, 27 pages.
Kubernetes Documentation: Persistent Volumes, available at <URL: https://kubernetes.io/docs/concepts/storage/persistent-volumes/>, Jun. 29, 2020, 15 pages.
Kubernetes Documentation: Using Admission Controllers, available at <URL: https://kubernetes.io/docs/reference/access-authn-authz/admission-controllers/#mutatingadmissionwebhook>, Jun. 19, 2020, 22 pages.
"Policy-Based Control for Cloud Native Environments", Open Policy Agent, available at <URL: https://www.openpolicyagent.org/>, copyright 2019, 13 pages.

\* cited by examiner

DISKS IN A VIRTUALIZED COMPUTING ENVIRONMENT THAT ARE BACKED BY REMOTE STORAGE

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A virtual machine running on a host is one example of a virtualized computing instance or workload. A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc.

Modern data science (DS) platforms use public cloud storage systems, such as Amazon Web Services (AWS) Simple Storage Service (S3), for their data lakes and other data repositories, rather than traditional storage architectures (such as Hadoop-based architectures). With public cloud based storage, enterprises can access files at the public cloud storage system using a suitable communication protocol such as hypertext transfer protocol (HTTP) and such enterprises need not worry about managing large storage systems. Therefore, public cloud storage systems are popular for DS applications such as data analysis, machine learning (ML), etc. that access large amounts of data.

However, whenever virtualized computing instances access a public cloud storage system for the data stored therein, there are costs and performance overheads associated with this access. ML and other DS applications need to access data frequently and repeatedly. However, frequent and repeated accessing of the public cloud storage system can be costly and result in increased performance overheads.

DETAILED DESCRIPTION

Figure 1:
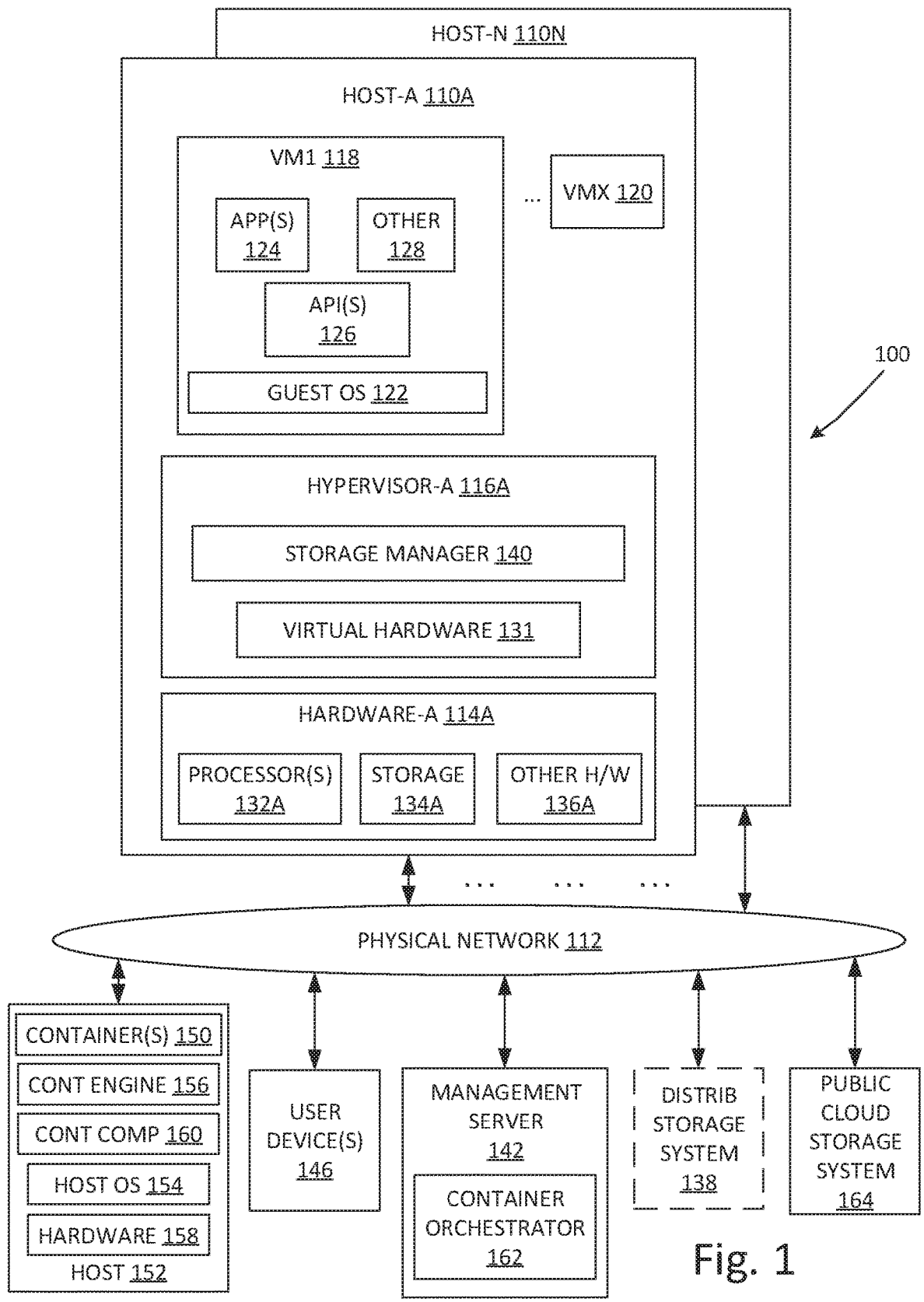
FIG. 1 is a schematic diagram illustrating an example virtualized computing environment having virtualized computing instances that use a private cloud storage system that is backed by a public cloud storage system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses some of the drawbacks associated with using a remote public cloud storage system, by providing a hybrid cloud storage solution that integrates the remote public cloud storage system with a local (on-premises) private cloud storage system. When data in the public cloud storage system is accessed by a virtualized computing instance, such as a virtual machine (VM) or a container in a virtualized computing environment, the accessed data is partially or fully cached in the private cloud storage system of the virtualized computing environment. After being cached, the data can be cloned and attached to both VMs and containers to enable applications running on the VMs/containers to consume the data. This hybrid cloud storage solution therefore provides data in the private cloud system that is backed by data in the public cloud storage system, and the hybrid cloud storage solution further enables the number of accesses to the public cloud storage system to be reduced (since the data can instead be accessed from the cache), thereby resulting in a corresponding reduction in costs and performance overhead associated with using the public cloud storage system.

Computing Environment

To further explain the operation and elements of a hybrid cloud storage solution, various implementations will now be explained in more detail using FIG. 1, which is a schematic diagram illustrating an example virtualized computing environment 100 having virtualized computing instances that use a private cloud storage system that is backed by a public cloud storage system For the purposes of explanation, some elements are identified as being one or more of: application program interfaces (APIs), subroutines, applications, background processes, daemons, scripts, software modules, engines, orchestrators, managers, drivers, user interfaces, agents, proxies, services, or other type or implementation of computer-executable instructions stored on a computer-readable medium and executable by a processor. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include some substantially similar elements and features, unless otherwise described herein.

The host-A 110A includes suitable hardware 114A and virtualization software (e.g., a hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest operating system 122. VM1 118 may include application program interfaces (APIs) 126, including one or more APIs that operate with the application(s) 124 to issue API calls to request data for use by the application 124(s), to access data from storage, etc. VM1 118 may include still further other elements 128, such as binaries, libraries, and various other elements that support the operation of VM1 118. For the sake of brevity, further details of such other elements 128 will not be provided herein.

The hypervisor-A 116A may be a software layer or component that supports the execution of multiple virtualized computing instances. Hypervisor 116A may run on top of a host operating system (not shown) of the host-A 110A or may run directly on hardware 114A. The hypervisor 116A maintains a mapping between underlying hardware 114A and virtual resources (depicted as virtual hardware 131) allocated to VM1 118 and the other VMs. A storage manager 140 may reside in the hypervisor-A 116A or elsewhere in the host-A 110. The storage manager 140 of various embodiments may be configured to receive API calls from the API 126 of VM1 118 that is requesting access to data, and then determine whether the requested data should be provided to VM1 118 from a private (local or on-premises) cloud storage system, from a remote public cloud storage system, or both. Further details pertaining to operations performed by the storage manager 140 will be provided later below with respect to FIG. 2 and the subsequent figures.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 131) are allocated to each virtual machine to support a guest operating system (OS) and application(s) in the virtual machine, such as the guest OS 122 and the applications 124 (e.g., a word processing application, accounting software, a browser, etc.). Corresponding to the hardware 114A, the virtual hardware 130 may include a virtual CPU (including a virtual graphics processing unit (vGPU)), a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 138 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource 134A of the host-A 110A and the corresponding storage resource of each of the other hosts) can be aggregated together to form the distributed storage system 138 that is accessible to and shared by each of the host-A 110A . . . host-N 110N. In this manner, the distributed storage system 138 is shown in broken lines in FIG. 1, so as to symbolically represent that the distributed storage system 138 is formed as a virtual/logical arrangement of the physical storage devices (e.g., the storage resource 134A of host-A 110A) located in the host-A 110A . . . host-N 110N. However, in addition to these storage resources, the distributed storage system 138 may also include stand-alone storage devices that may not necessarily be a part of or located in any particular host.

The distributed storage system 138 can be used to implement the private cloud storage system. Thus, the distributed storage system 138 can provide local on-premises storage capability, including serving as a filesystem with caching capability, for each of the host-A 110A . . . host-N 110 and the virtual computing instances that run on these hosts.

The host-A 110A has been described above as running the virtual machines VM1 118 . . . VMX 120. One or more of the hosts in the cluster of host-A 110A . . . host-N 110N may run containers. As used herein, the term container (also known as a container instance) is used generally to describe an application that is encapsulated with all its dependencies (e.g., binaries, libraries, etc.). An example is separately shown in FIG. 1 as the host 152.

In the container configuration for the host 152, one or more containers 150 can run on the host 152 and share a host OS 154 with each other, with each of the containers 150 running as isolated processes. The containers 150 and their corresponding container engine 156 can use hardware 158 of the host 152 directly, without implementing a hypervisor, virtual machines, etc. in this example. The container engine 156 may be used to build and distribute the containers 150. The container engine 156 and related container technology is available from, among others, Docker, Inc.

The host 152 may further include one or more container components, generally depicted at 160. The components 160 may include one or more of: an orchestrator agent, an orchestrator proxy, and other orchestrator element(s) in the host 152 that are distributed sub-elements of a container orchestrator 162 resident at a management server 142. The container orchestrator 162 (including its sub-elements depicted at 160) may cooperate with the container engine 156 to perform, among other things, scaling, scheduling, running, monitoring, updating and removing, and other management of the containers 150. An example of the container orchestrator 162 is the Kubernetes (K8s) platform. In the K8s platform, multiple containers 150 can be arranged together into a Pod. A Pod is one example of a group/arrangement of one or more containers that may be tightly coupled together and/or that may share resources. In some embodiments, the components 160 may further include a cloud native storage (CNS) container storage interface (CSI) driver that is used to create local data files that are copied/accessed from the public cloud storage system 164, as will be further described below with respect to FIG. 2.

While FIG. 1 shows containers 150 running on the host 152 and sharing the host OS 154, without the presence of a hypervisor, other container configurations may be provided in a container environment within or outside of the virtualized computing environment 100. For example, one or more containers (and their container engine) may reside inside in any of the virtual machines VM1 118 . . . VMX 120 in a containers-on-virtual-machine approach. In such a containers-on-virtual-machine approach, the storage manager 140 and/or other manager/element running in the hypervisor-A 116A or elsewhere in the host-A 110A may be provided with functionality/capability similar to the orchestrator agent 160 and/or the container orchestrator 162 and its sub-elements. Such functionality/capability may include, for example, configuring and updating the containers, monitoring the operation of the containers, controlling/managing the operation of the containers, communicating requests to and receiving responses from the containers, and performing other tasks associated with the operation of the containers (including accessing data files from caches or remote storage).

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionality of the management server 142 (including communicating with the storage manager 140 and using the container orchestrator 162) may be accessed via one or more user devices 146 that are operated by a user such as a system administrator. For example, the user device 146 may include a web client (such as a browser-based application) that provides a user interface operable by the system administrator to view and monitor the operation (such as storage-related operations) of the containers and VMs, via the management server 142.

The management server 142 may be communicatively coupled to host-A 110A . . . host-N 110N (and hence communicatively coupled to the virtual machines, hypervisors, containers, hardware, etc.) via the physical network 112. The host-A 110A . . . host-N 110N may in turn be configured as a datacenter that is managed by the management server 142, and the datacenter may support a web site. In some embodiments, the functionality of the management server 142 may be implemented in any of host-A 110A . . . host-N 110N, instead of being provided as a separate standalone device such as depicted in FIG. 1.

A remote public cloud storage system 164 may be communicatively coupled to the virtualized computing environment 100 via the physical network 112. The public cloud storage system 164 operates as the data repository (such as a data lake) for data consumed/used by the applications, VMs, containers, etc. in the virtualized computing environment 100, including data used for data science (DS), machine learning (ML), analytics, etc. The public cloud storage system 164 may be implemented using cloud storage platforms such as AWS S3, Google Cloud Storage, Microsoft Windows Azure Storage, etc.

Depending on various implementations, one or more of the physical network 112, the management server 142, the host 152, the distributed storage system 138, and the user device(s) 146 can comprise parts of the virtualized computing environment 100, or one or more of these elements can be external to the virtualized computing environment 100 and configured to be communicatively coupled to the virtualized computing environment 100 and to the public cloud storage system 164.

Hybrid Cloud Storage System

Figure 2:
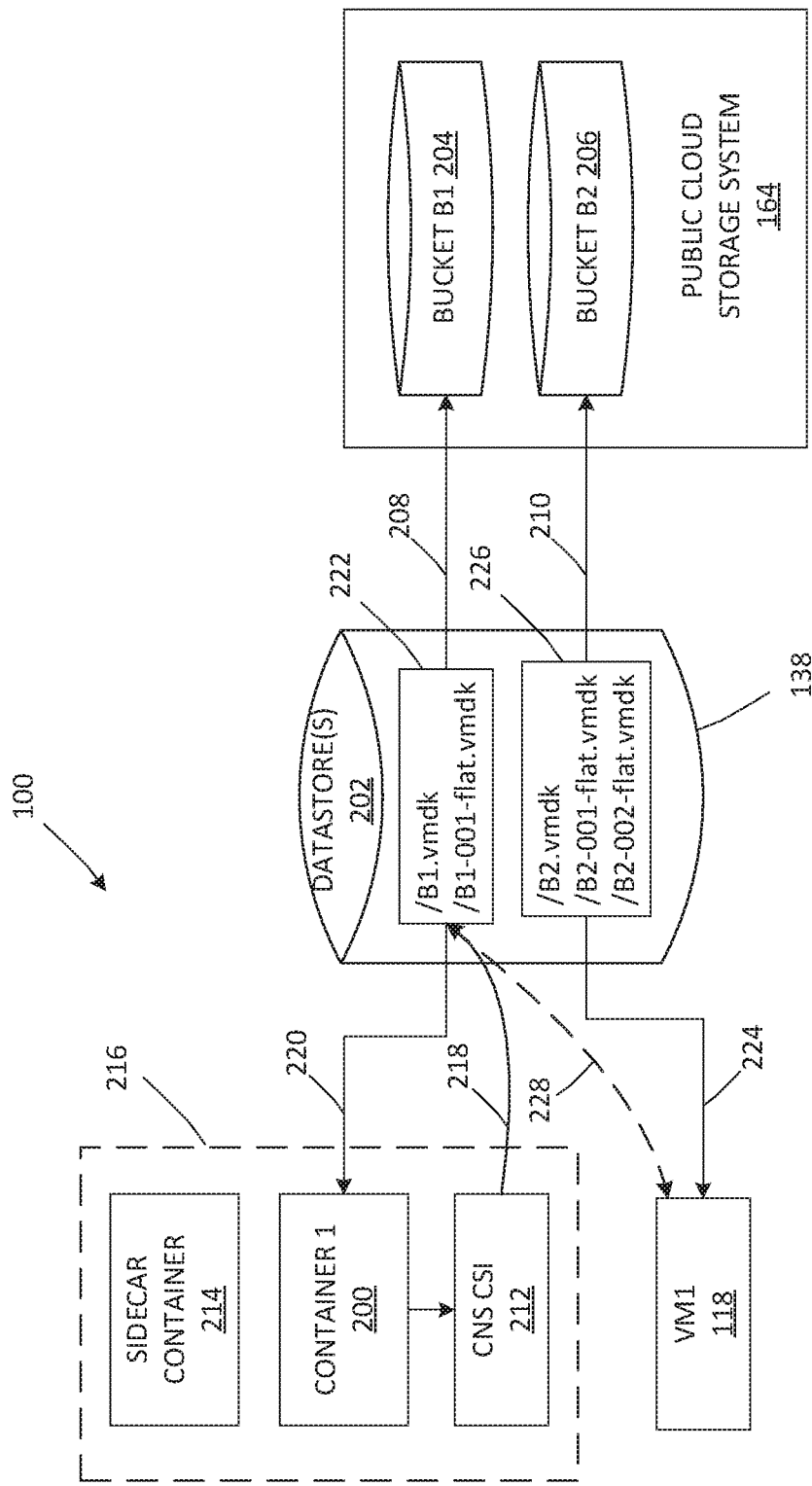
FIG. 2 is a block diagram illustrating some of the components of the private cloud storage system and the public cloud storage system that cooperate to provide a hybrid cloud storage system for the virtualized computing environment of FIG. 1.

FIG. 2 is a block diagram illustrating some of the components of the private cloud storage system (e.g., the distributed storage system 138) and the public cloud storage system 164 that cooperate to provide a hybrid cloud storage system for the virtualized computing environment 100 of FIG. 1. Specifically, FIG. 2 shows the virtual machine VM1 118 and a container 200 (e.g., one of the containers 150 in FIG. 1), both of which are able to execute workflows (e.g., such as DS workflows) that require access to data that is stored in the public cloud storage system 164, wherein at least some of that data may be stored or cached in at least one on-premises datastore 202 after being accessed/read from the public cloud storage system 164.

The on-premises datastore 202 is represented/labeled in FIG. 2 as residing in the distributed storage system 138, which is operating as the private cloud storage system. The public cloud storage system 164 stores data (e.g., maintains a data lake or other data repository), and the data may be arranged in buckets (such as a first bucket B1 204 and a second bucket B2 206) or other types of storage space (including folders, catalogs, directories, etc.). Such storage spaces will be referred to as buckets in the various examples hereinafter and for purposes of illustration, the container 200 will need to access files in the first bucket B1 204 for its workflow, and the virtual machine VM1 118 will be need to access files in the second bucket B2 206 for its workflow. The buckets of the public cloud storage system 164 may be presented as a filesystem in the datastore 202. One technique, for presenting the buckets of the public cloud storage system 164 as a filesystem in the datastore 202, is based on the filesystem in userspace (FUSE) platform, which presents the buckets as a portable operating system interface (POSIX) filesystem to containers and VMs that access the datastore 202.

A file may be created in the datastore 202 that references a respective bucket of the public cloud storage system 164. For instance, the POSIX filesystem in the datastore 202 may contain or identify virtual machine disk (VMDK) files that reference or that are otherwise associated with respective buckets of the public cloud storage system 164. In the example of FIG. 2, a first VMDK file (B1.vmdk) references or otherwise points to (as shown by the arrow 208) the first bucket B1 204, and a second VMDK file (B2.vmdk) references or otherwise points to (as shown by the arrow 210) the second bucket B2 206.

Various techniques and components can be provided to create the VMDK files of the POSIX filesystem, to reference the VMDK files to respective buckets of the public cloud storage system 164, to mount or otherwise link/attach the VMDK files and/or buckets to VMs and containers, and to perform other related functions. For VMs, the storage manager 140 can perform at least some of these functions.

For containers, a CNS CSI driver 212 (e.g., one of the container components 160 shown in FIG. 1), in cooperation with a sidecar container 214, can perform at least some of these functions in some embodiments. For instance, the sidecar container 214 is present in a same group 216 (such as a Pod) as the container 200, and shares access to the POSIX filesystem with the container 200. The sidecar container 214 lives as long as the group 216 lives. The sidecar container 214 of one embodiment uses open source tools (such as Goofys or Catfs) to provide the sidecar container 214 with functionality to mount buckets as POSIX filesystems in containers, and also to add caching capability (described later below). In other embodiments, tools and other functionality can be installed in or programmed for the container 200, alternatively or additionally to using the sidecar container 214 to perform the mounting, VMDK file creation, caching, etc. operations that pertain to using the public cloud storage system 164 in a hybrid cloud storage solution.

In operation when the container 200 makes an API call to read a data file in the first bucket B1 204, the CNS CSI driver 212 intercepts the API call and determines whether the data file is locally cached in the datastore 202. If not locally cached, then the CNS CSI driver 212 obtains the data file from the first bucket B1 204, and provides the data file to the container 200. Furthermore, the CNS CSI driver 212 creates (shown at 218) a flat disk (/B1-001-flat.vmdk) for the VMDK file (/B1.vmdk) that is attached (shown at 220) to the container 200 (and also to the sidecar container 216), and this flat disk is used to locally cache the data file that was read from the first bucket B1 204. Thereafter, future requests from the container 200 or other containers/VMs for the data file can be served from this flat disk, rather than accessing the first bucket B1 204 at the public cloud storage system 164.

The VMDK file (/B1.vmdk) and its flat disk (/B1-001-flat.vmdk) are collectively shown as a disk 222 in FIG. 2. As stated above, the VMDK file (/B1.vmdk) contains a reference to the first bucket B1 204, and further contains other descriptor information that identifies the flat disk (/B1-001-flat.vmdk) which includes the actual cached data file from the first bucket B1 204. Since a cache grows as more data files are read from buckets of the public cloud storage system 164, some embodiments may limit the maximum size of a flat disk (e.g., limited to approximately 2 GB) so as to avoid pre-allocating large disks. In other embodiments, flat disks may be created as needed. In still further embodiments, thin formatted disks may be used.

An analogous process as that described above can be used when the virtual machine VM1 118 makes an API call to read a data file in the second bucket B2 206. The storage manager 140 (shown in FIG. 1) intercepts the API call and determines whether the data file is locally cached in the datastore 202. If not locally cached, then the storage manager 140 obtains the data file from the second bucket B2 206, and provides the data file to the virtual machine VM1 118. Furthermore, the storage manager 140 creates a flat disk (/B2-001-flat.vmdk) for the VMDK file (/B2.vmdk) that is attached (shown at 224) to the virtual machine VM1 118, and this flat disk is used to locally cache the data file that was read from the second bucket B2 206. Thereafter, future requests from the virtual machine VM1 118 or other containers/VMs for the data file can be served from this flat disk, rather than accessing the second bucket B2 206 at the public cloud storage system 164.

As shown by way of example in FIG. 2, the VMDK file (/B2.vmdk) may have multiple flat disks that store cached data files from the same bucket B2: /B2-001-flat.vmdk and /B2-002-flat.vmdk, all collectively shown as a disk 226. In some embodiments, a consolidate operation may be performed to combine multiple flat disks into a single larger disk/file.

In some implementations of the public cloud storage system 164, bucket names are globally unique. Thus in the example of FIG. 1, the bucket names B1 and B2 uniquely identify each bucket. Referencing files by their bucket names (e.g., /B1.vmdk and /B2.vmdk), instead of the containers or VMs that these files are attached to, improves performance if another/additional container or VM creates a new VMDK file that references a bucket that is already referenced by an existing VMDK file. A linked clone operation can be performed to link the new VMDK file with the existing VMDK file. This linking enables the additional container/VM to access the existing flat disk(s) in the existing VMDK file, which is linked to the new VMDK file, without having to create new and repetitive flat disk(s) in the new VMDK file, thereby reducing the amount of time needed to read files.

Also as shown at 228 in FIG. 2, the existing disk 222 (attached to the container 200) can be reused by the virtual machine VM1 118 and/or by some other container. For example, the disk 222 can be detached from the container 200 and attached (e.g., migrated) to some other VM/container, without the need to implement a linked clone, since the disk 222 is no longer attached to the container 200. As another example, the container 200 can be shared with some other VM/container, while remaining concurrently attached to the container 200. Thus, the disks in the datastore 202 are portable from one virtualized computing instance to another. As explained above, cloning and consolidation of disks may also be performed.

Figure 3:
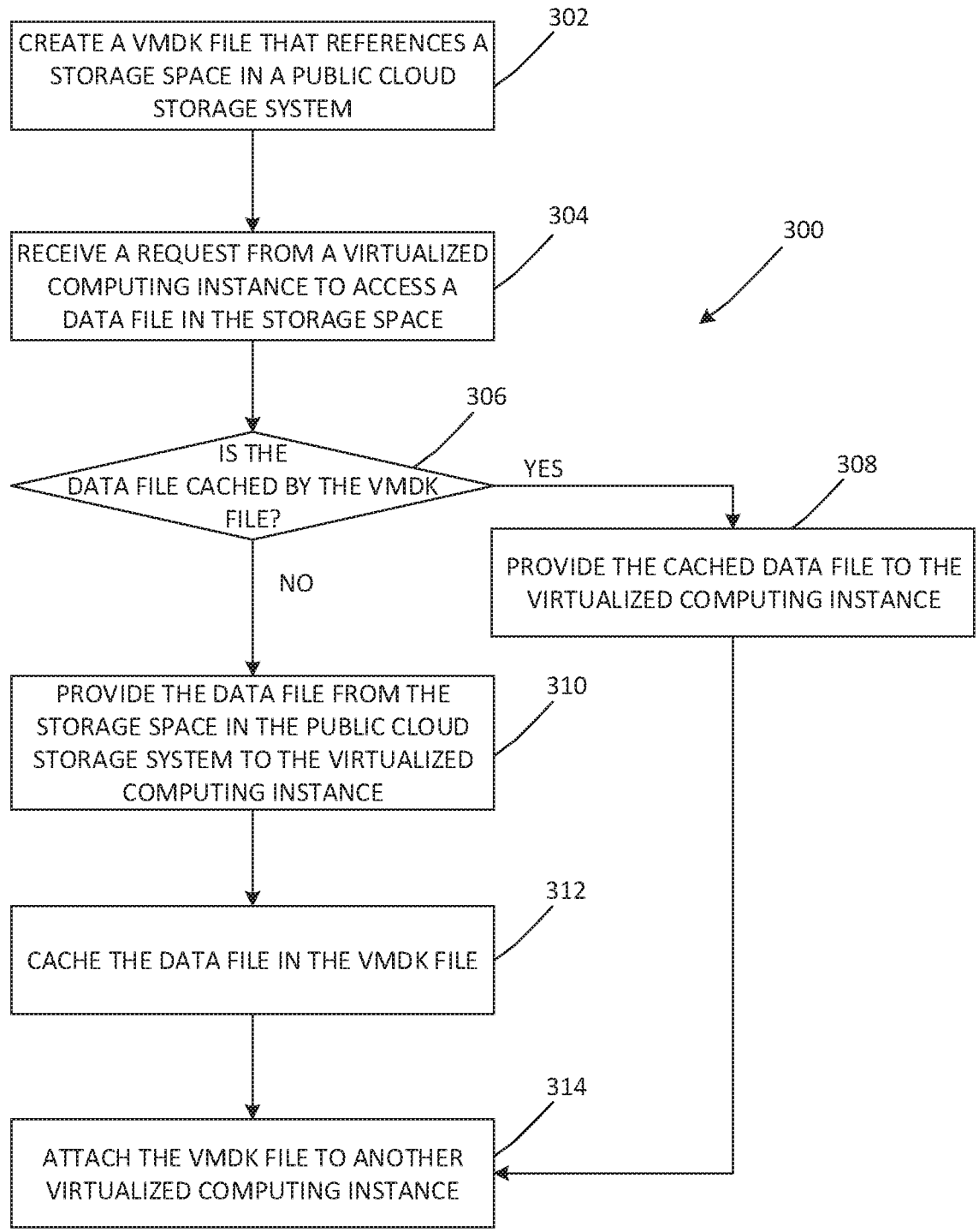
FIG. 3 is a flowchart of an example method to operate a hybrid cloud storage system for the virtualized computing environment of FIG. 1.

Further details about the hybrid cloud storage system of FIGS. 1 and 2 are described next with respect to FIG. 3. Specifically, FIG. 3 is a flowchart of an example method 300 to operate a hybrid cloud storage system for the virtualized computing environment 100 of FIG. 1. The example method 300 may include one or more operations, functions, or actions illustrated by one or more blocks, such as blocks 302 to 314. The various blocks of the method 300 and/or of any other process(es) described herein may be combined into fewer blocks, divided into additional blocks, supplemented with further blocks, and/or eliminated based upon the desired implementation. In one embodiment, the operations of the method 300 may be performed in a pipelined sequential manner. In other embodiments, some operations may be performed out-of-order, in parallel, etc.

At a block 302 ("CREATE A VMDK FILE THAT REFERENCES A BUCKET IN A PUBLIC CLOUD STORAGE SYSTEM"), a VMDK file (e.g., /B1.vmdk or /B2.vmdk) is created in the datastore 202 of the private cloud storage system. The VMDK file references or is otherwise associated with a bucket (e.g., buckets B1 or B2) in the public cloud storage system 164. The storage manager 140 may create the VMDK file for a VM, and the bucket (via the VMDK file) may be presented or otherwise identified in a POSIX filesystem that is accessible by the VM. In some embodiments, the VMDK file may be created with a first class disk (FCD) construct.

In the context of a container (such as the container 200 in FIG. 2), the container sidecar 214 can operate tools (such as Goofys or Catfs) to present the bucket to the container 200 as a read-only volume in the POSIX filesystem. In some embodiments, both the container 200 and the sidecar container 214 can mount a Kubernetes emptyDir volume, which is shared between these two containers and which is populated with the read-only volume (the VMDK file).

At a block 304 ("RECEIVE A REQUEST FROM A VIRTUALIZED COMPUTING INSTANCE TO ACCESS A DATA FILE IN THE BUCKET"), the storage manager 140 intercepts a API call from the virtual machine VM1 118 that requests access to a data file in a bucket at the public cloud storage system 164. With a container implementation, the CNS CSI driver 212 intercepts this API call from the container 200. At a block 306 ("IS THE DATA FILE CACHED BY THE VMDK FILE?"), the storage manager 140 or the CNS CSI driver 212 determines whether the requested data file is locally cached in the datastore 202 of the private cloud storage system. If the data file is cached ("YES" at the block 306), then the data file is served from the cache and provided to the requesting VM/container at a block 308 ("PROVIDE THE CACHED DATA FILE TO THE VIRTUALIZED COMPUTING INSTANCE").

However, if the requested data file is determined to be absent from the cache (e.g., not cached previously) ("NO" at the block 306), then the storage manager 140 or the CNS CSI driver 212 passes the API call to the public cloud storage system 164 so that the public cloud storage system 164 can provide the requested data file to the VM/container, at a block 310 ("PROVIDE THE DATA FILE FROM THE PUBLIC CLOUD STORAGE SYSTEM TO THE VIRTUALIZED COMPUTING INSTANCE").

Moreover at a block 312 ("CACHE THE DATA FILE IN THE VMDK FILE"), the storage manager 140 or the CNS CSI 212 caches the data file in the VMDK file. In one embodiment for container implementations, the sidecar container 214 uses the persistent volume feature provided by CNS platforms to create persistent flat disks for caching in the VMDK file.

Accordingly at a block 314 ("ATTACH THE VMDK FILE TO ANOTHER VIRTUALIZED COMPUTING INSTANCE"), since the flat disk is kept persistent via the persistent volume feature, the VMDK file can be attached to another virtualized computing instance for portability. For example, the VMDK file can be detached from one VM/container and attached (migrated) to another VM/container. The VMDK file can also be attached to another VM/container, without detaching from the current VM/container, such that the VMDK file is attached to multiple VMs/containers concurrently.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-3. For example, computing devices capable of acting as host devices or user devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to provide A hybrid solution between public cloud storage and private cloud storage.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method in a virtualized computing environment to operate a hybrid cloud storage system that includes a private cloud storage system and a public cloud storage system, the method comprising:

creating, in the private cloud storage system, a virtual machine disk (VMDK) file that references a storage space in the public cloud storage system;

receiving, from a first virtualized computing instance that runs in the virtualized computing environment and that is attached to the VMDK file, a request for a data file stored in the storage space;

determining whether the requested data file is cached by the VMDK file;

in response to a determination that the requested data file is cached by the VMDK file, providing the cached data file to the first virtualized computing instance;

in response to a determination that the requested data file is absent in the VMDK file, providing the data file to the first virtualized computing instance from the storage space in the public cloud storage system and caching the data file in the VMDK file; and attaching the VMDK file to at least a second virtualized computing instance, wherein the VMDK file uniquely identifies the storage space rather than the first virtualized computing instance so as to enable the VMDK file to be portable from the first virtualized computing instance to the at least the second virtualized computing instance.

2. The method of claim 1, wherein the first virtualized computing instance includes a first virtual machine, and wherein the at least the second virtualized computing instance includes a second virtual machine or a container or both.

3. The method of claim 1, wherein the first virtualized computing instance includes a first container, and wherein the at least the second virtualized computing instance includes a virtual machine or a second container or both.

4. The method of claim 3, wherein the first container is arranged in a group along with a sidecar container, and wherein the sidecar container presents the storage space to the first container as a read-only volume in a filesystem that identifies the VMDK file, and wherein the sidecar container further caches the data file into the VMDK file when the data file is read from the public cloud storage system.

5. The method of claim 1, wherein caching the data file into the VMDK file includes storing the data file into a flat disk of the VMDK file.

6. The method of claim 5, further comprising consolidating the flat disk along with other flat disks of the VMDK file into a single larger disk to enable an increased number of data files to be portable between multiple virtualized computing instances.

7. The method of claim 1, wherein attaching the VMDK file to the at least the second virtualized computing instance includes one of:

detaching the VMDK file from the first virtualized computing instance, and migrating the VMDK file to the at least the second virtualized computing instance for attachment thereto; or attaching the VMDK file to the at least the second virtualized computing instance concurrently with attachment to the first virtualized computing instance; or cloning the VMDK file for attachment to the at least the second virtualized computing instance, and linking the cloned VMDK file to the second virtualized computing instance.

8. A non-transitory computer-readable medium having instructions stored thereon, which in response to execution by one or more processors, cause the one or more processors to perform or control performance of a method in a virtualized computing environment to operate a hybrid cloud storage system that includes a private cloud storage system and a public cloud storage system, wherein the method comprises:

creating, in the private cloud storage system, a virtual machine disk (VMDK) file that references a storage space the public cloud storage system;

receiving, from a first virtualized computing instance that runs in the virtualized computing environment and that is attached to the VMDK file, a request for a data file stored in the storage space;

determining whether the requested data file is cached by the VMDK file;

in response to a determination that the requested data file is cached by the VMDK file, providing the cached data file to the first virtualized computing instance;

in response to a determination that the requested data file is absent in the VMDK file, providing the data file to the first virtualized computing instance from the storage space in the public cloud storage system and caching the data file in the VMDK file; and attaching the VMDK file to at least a second virtualized computing instance, wherein the VMDK file uniquely identifies the storage space rather than the first virtualized computing instance so as to enable the VMDK file to be portable from the first virtualized computing instance to the at least the second virtualized computing instance.

9. The non-transitory computer-readable medium of claim 8, wherein the first virtualized computing instance includes a first virtual machine, and wherein the at least the second virtualized computing instance includes a second virtual machine or a container or both.

10. The non-transitory computer-readable medium of claim 8, wherein the first virtualized computing instance includes a first container, and wherein the at least the second virtualized computing instance includes a virtual machine or a second container or both.

11. The non-transitory computer-readable medium of claim 10, wherein the first container is arranged in a group along with a sidecar container, and wherein the sidecar container presents the storage space to the first container as a read-only volume in a filesystem that identifies the VMDK file, and wherein the sidecar container further caches the data file into the VMDK file when the data file is read from the public cloud storage system.

12. The non-transitory computer-readable medium of claim 8, wherein caching the data file into the VMDK file includes storing the data file into a flat disk of the VMDK file.

13. The non-transitory computer-readable medium of claim 12, wherein the method further comprises consolidating the flat disk along with other flat disks of the VMDK file into a single larger disk to enable an increased number of data files to be portable between multiple virtualized computing instances.

14. The non-transitory computer-readable medium of claim 13, wherein attaching the VMDK file to the at least the second virtualized computing instance includes one of:

detaching the VMDK file from the first virtualized computing instance, and migrating the VMDK file to the at least the second virtualized computing instance for attachment thereto; or attaching the VMDK file to the at least the second virtualized computing instance concurrently with attachment to the first virtualized computing instance; or cloning the VMDK file for attachment to the at least the second virtualized computing instance, and linking the cloned VMDK file to the second virtualized computing instance.

15. A device in a virtualized computing environment, the device comprising:
a processor; and
a non-transitory computer-readable medium coupled to the processor and having instructions stored thereon, which in response to execution by the processor, cause the processor to perform or control performance of operations for a hybrid cloud storage system that includes a private cloud storage system and a public cloud storage system, wherein the operations include:
create, in the private cloud storage system, a virtual machine disk (VMDK) file that references a storage space in the public cloud storage system;
receive, from a first virtualized computing instance that runs in the virtualized computing environment and that is attached to the VMDK file, a request for a data file stored in the storage space;
determine whether the requested data file is cached by the VMDK file;
in response to a determination that the requested data file is cached by the VMDK file, provide the cached data file to the first virtualized computing instance;
in response to a determination that the requested data file is absent in the VMDK file, provide the data file to the first virtualized computing instance from the storage space in the public cloud storage system and cache the data file in the VMDK file; and
attach the VMDK file to at least a second virtualized computing instance, wherein the VMDK file uniquely identifies the storage space rather than the first virtualized computing instance so as to enable the VMDK file to be portable from the first virtualized computing instance to the at least the second virtualized computing instance.

16. The device of claim 15, wherein the first virtualized computing instance includes a first virtual machine, and wherein the at least the second virtualized computing instance includes a second virtual machine or a container or both.

17. The device of claim 15, wherein the first virtualized computing instance includes a first container, and wherein the at least the second virtualized computing instance includes a virtual machine or a second container or both.

18. The device of claim 17, wherein the first container is arranged in a group along with a sidecar container, and wherein the sidecar container presents the storage space to the first container as a read-only volume in a filesystem that identifies the VMDK file, and wherein the sidecar container further caches the data file into the VMDK file when the data file is read from the public cloud storage system.

19. The device of claim 15, wherein the operations to cache the data file into the VMDK file include operations to store the data file into a flat disk of the VMDK file.

20. The device of claim 19, wherein the operations further comprise:
consolidate the flat disk along with other flat disks of the VMDK file into a single larger disk to enable an increased number of data files to be portable between multiple virtualized computing instances.

21. The device of claim 15, wherein the operations to attach the VMDK file to the at least the second virtualized computing instance include operations to perform one of:
detach the VMDK file from the first virtualized computing instance, and migrating the VMDK file to the at least the second virtualized computing instance for attachment thereto; or
attach the VMDK file to the at least the second virtualized computing instance concurrently with attachment to the first virtualized computing instance; or
clone the VMDK file for attachment to the at least the second virtualized computing instance, and linking the cloned VMDK file to the second virtualized computing instance.

* * * * *